United States Patent

Clegg

[11] Patent Number: 4,492,424
[45] Date of Patent: Jan. 8, 1985

[54] SOLAR COLLECTOR
[76] Inventor: John E. Clegg, 2320 Keystone Dr., Orlando, Fla. 32806
[21] Appl. No.: 282,042
[22] Filed: Jul. 10, 1981
[51] Int. Cl.³ .............................................. G02B 5/14
[52] U.S. Cl. .................. 350/96.10; 126/417; 350/96.24
[58] Field of Search ............... 350/96.10, 96.24, 96.25, 350/96.15; 126/417

[56] References Cited

U.S. PATENT DOCUMENTS

| | | | |
|---|---|---|---|
| 3,780,722 | 12/1973 | Swet | 350/96.15 X |
| 3,874,783 | 4/1975 | Cole | 350/96.24 |
| 3,970,070 | 7/1976 | Meyer et al. | 350/96.24 X |
| 4,201,197 | 5/1980 | Dismer | 350/96.10 X |
| 4,297,000 | 10/1981 | Fries | 350/96.24 |
| 4,307,936 | 12/1981 | Ochiai | 350/96.24 |
| 4,375,380 | 3/1983 | Genequand et al. | 126/417 X |

FOREIGN PATENT DOCUMENTS 52-15339  2/1977  Japan .................. 350/96.10

Primary Examiner—John D. Lee

[57] ABSTRACT

The disclosure is a solar collector consisting of glass rods enclosed in a housing and mounted vertically on a roof or other elevated place to gather solar rays. The collector is fixed, with no tracking device or other moving parts. The glass rods are 6 mm or smaller in diameter, and there can be several thousand, depending on the sizes of the rods and collector. The upper ends of the rods are inclined at an angle of thirty degrees from horizontal, with the inclined surfaces occupying a plane which faces south so as to obtain maximum exposure to the winter sun. Solar rays striking the inclined ends of the rods are refracted into the rods. The rays travel down through the rods, with a predominantly parallel path of propagation being established by repeated reflections off the inside walls of the rods. The rays are emitted from the lower perpendicular ends of the rods as parallel rays of incoherent light which are directed into beam concentrators.

1 Claim, 2 Drawing Figures

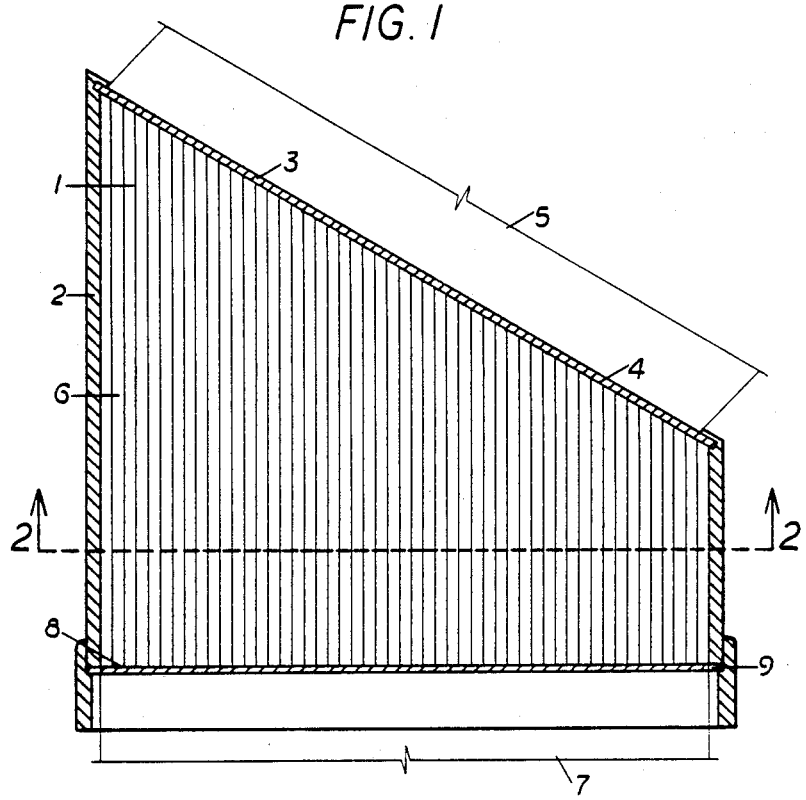
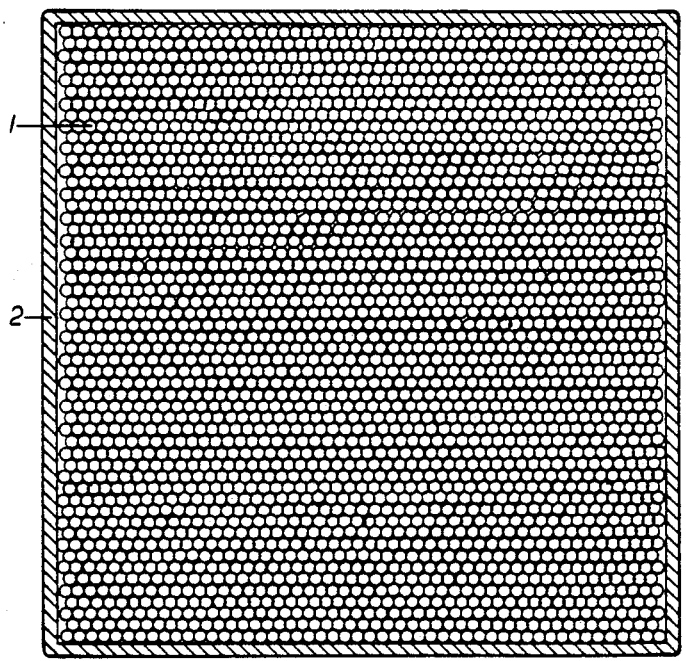

SOLAR COLLECTOR

BACKGROUND OF THE INVENTION

The invention relates to optical light-gathering instruments, specifically to fixed glass-rod solar collectors.

Prior art includes the fixed solar panels for heating water and the dish-shaped solar receptors for converting solar heat to electricity, with automatic tracking devices. Both of these devices are receptors only, and there is no means of transmitting the rays, as there is with the disclosure, which is a receptor and transmitter.

SUMMARY OF THE INVENTION

The obvious advantage of the disclosure over solar receptors with tracking devices is that there are no mechanical parts which must be operated by electricity and which require maintenance and replacement of parts. The disadvantage is that the collector is fixed and does not receive the full complement of solar rays since its face is not perpendicular to the sun.

This disadvantage is compensated for by the simple expedient of increasing the size of the solar collector. The increase in size and weight has no effect on the operation of a fixed collector as it would on the tracking solar receptor in which size and weight distribution are critical factors.

DESCRIPTION OF THE DRAWINGS

FIG. 1 is an elevation of the solar collector.
FIG. 2 is a cross section taken on line 2—2 of FIG. 1.

DESCRIPTION OF THE PREFERRED EMBODIMENT

FIG. 1 shows vertical glass rods 1 enclosed in housing 2 under plate glass cover 3. Exposed inclined upper ends 4 of glass rods 1 lie in a common plane inclined 30° from horizontal, with the inclination facing the equator so as to present maximum exposure to the winter sun. Incipient solar beam 5 is refracted through glass cover 3, strikes exposed upper ends 4 and is refracted down into glass rods 1.

Refracted solar rays 6 are transmitted down through glass rods 1, with a predominantly parallel path of propagation of rays 6 being established by repeated reflection off the walls of glass rods 1.

Parallel solar rays 7 are emitted through perpendicular lower ends 8 of glass rods 1, pass through plate glass cover 9 and enter a prismatic beam concentrator (not shown).

FIG. 2 is a cross sectional view of glass rods 1 and casing 2. There are 2500 rods with a diameter of 6 mm occupying an area of 900 $cm^2$. This area is somewhat larger than that which would be required if a solid beam were transmitted through the collector, because there must be an increase in the number of rods and in the size of the collector to compensate for the loss of transmitted rays in the spaces between the rods.

The distinctive features by which the invention is distinguishable over prior art of record including flexible optical fiber collectors is that rigid glass rods with diameters far greater than that of optical fibers are used. Whereas the diameters of optical fibers are measured in microns, a typical size being 5 to 10 microns, the recommended diameters of the glass rods is 1 to 6 millimeters.

The surface area of each exposed inclined upper end 4 is larger than the cross sectional area of each glass rod 1 as shown in FIG. 2. This indicates that the collector will be equally effective hour for hour in winter when the sun is low in the sky, and when the days are short and the need of solar energy for heating is greatest, as in the summer when the sun is high in the sky.

I claim:

1. A solar collector comprising vertical glass rods enclosed in a housing under a plate glass cover, with the glass rods being of a relatively large diameter of one to six millimeters, with the exposed upper ends of the glass rods being uniformally inclined from horizontal, with the exposed inclined upper ends of the glass rods occupying a common plane, with the lower ends of the glass rods being perpendicular to the vertical axes of the glass rods and occupying a horizontal plane, with the glass rods being supported at their lower ends by a horizontal plate glass base; as a means of receiving, refracting and transmitting parallel solar rays in a vertical direction.

* * * * *